April 18, 1961  F. U. HEDSTRÖM  2,979,993
ROCK DRILL BIT AND METHOD OF MANUFACTURING SAME
Filed April 8, 1957  2 Sheets-Sheet 1
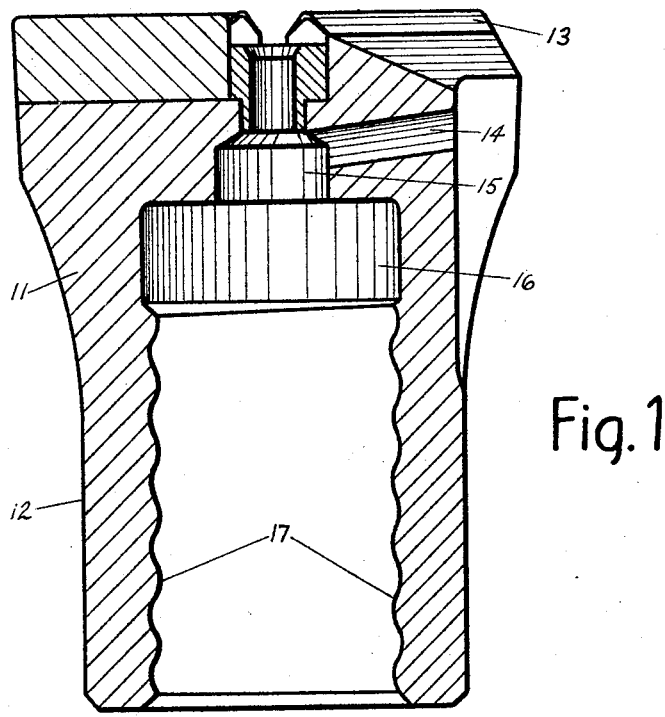
Fig. 1
Fig. 2
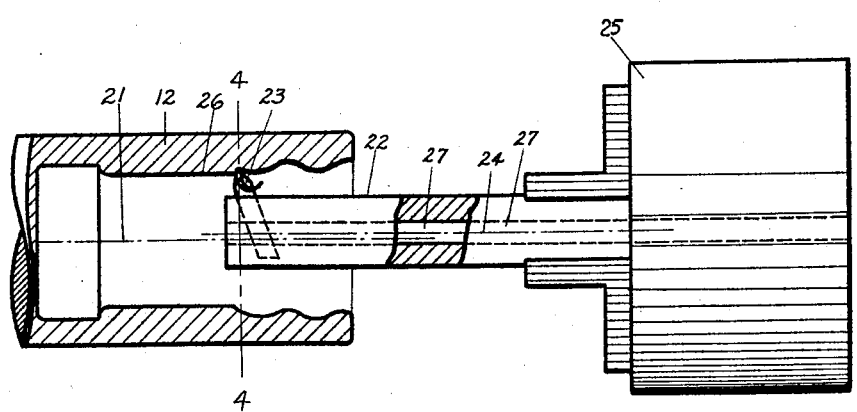
INVENTOR
FRITZ UNO HEDSTRÖM
By Pierce, Scheffler & Parker
Attorneys April 18, 1961   F. U. HEDSTRÖM   2,979,993
ROCK DRILL BIT AND METHOD OF MANUFACTURING SAME
Filed April 8, 1957   2 Sheets-Sheet 2

INVENTOR
Fritz Uno Hedström
By Pierce, Scheffler & Parker
Attorneys

United States Patent Office 2,979,993
Patented Apr. 18, 1961

2,979,993

ROCK DRILL BIT AND METHOD OF MANUFACTURING SAME

Fritz Uno Hedström, Sandviken, Sweden, assignor to Sandvikens Jernverks Aktiebolag, Sandviken, Sweden, a corporation of Sweden Filed Apr. 8, 1957, Ser. No. 651,424

Claims priority, application Sweden Apr. 17, 1956

1 Claim. (Cl. 90—11.42)

This invention relates to rock drill bits and more particularly to an improved construction and method of manufacture of bits having a rearwardly open internally threaded sleeve by which the bit may be attached to the complementary threaded end of a drill rod.

By way of background information it is quite common to manufacture rock drill bits for coupling to the end of a drill rod, the coupling being detachable for renewal of the bit. Various types of couplings have been devised. It is quite common to use couplings of the separate sleeve type and it is also quite common to arrange one of the coupling members integral with the drill bit. Thus, for example, the drill bit may include a rearwardly open tapered sleeve which is adapted to fit upon a complementary tapered end of the drill rod. However, the interfitting taper type of coupling has a disadvantage in that it is often difficult to obtain a firm attachment between the two tapered parts and once a good fit has been obtained, it is also often difficult to effect a separation between the two when a bit change is necessary.

Another type of coupling that is quite common is the threaded type wherein a rearwardly open sleeve portion of the bit is provided with internal threads which mate with an externally threaded pin portion on the end of the drill rod. The threads are usually of the discontinuous type but it has also been known to use threads of the continuous type and wherein the threads themselves have a rounded configuration, the round type of thread having the advantage that it provides a very good force distribution characteristic in the event that stresses arise at the threaded parts. The rounded type of thread also has the advantage in that it is more difficult to damage than a V-shaped or square shaped thread.

The known methods of cutting a round type of thread are by means of a milling cutter or by machining with form steels and the like but these methods have several disadvantages. One disadvantage is that the grooves cut by the thread cutting element have the same pitch as the threads on account of which the drill bit will have a tendency to become unthreaded from the drill rod. Moreover, it is difficult to obtain a smooth surface for the threads which makes it difficult to couple the bit to the threaded end of the drill rod. When the bit has a rather long sleeve portion to be threaded requiring a correspondingly long support for the milling cutter, the stresses created in the cutter during the cutting action cause the elongated support to bend thus leading to dimensional defects and unevenness of the thread surface being formed in the sleeve.

The present invention is directed to an improved method for forming a rounded continuous thread in the rearwardly open sleeve portion of a drill bit and which specifically overcomes all of the disadvantages inherent in the prior known methods for forming this type of thread. The invention is characterized in that the threads are cut into the sleeve by means of one or more narrow chisels which rotate within the sleeve in cutting contact with the sleeve surface combined with a simultaneous axial displacement of the sleeve relative to the rotating cutting chisel which is very small in comparison to the pitch of the rounded thread which is being cut. In other words, the axial advance of the chisel along the surface of the sleeve for each revolution of the chisel, i.e. the pitch of the groove cut by the chisel to form the thread is only a very small fraction of the pitch of the threads which are finally formed by the cutting action of the chisel. Rounded threads formed in accordance with the invention exhibit very smooth surfaces and thus may be made to close tolerance limits and hence enable a threaded interconnection with the drill rod having a more accurate fit and which better resists any tendency to become unthreaded during operation.

The invention is described in more detail in the following description of a preferred embodiment thereof and the accompanying drawings in which:

Fig. 1 is a view in diametral longitudinal section of a drill bit having the rounded threads cut into the sleeve portion;

Fig. 2 is a view showing a drill bit during the cutting of the threads;

Figure 3:
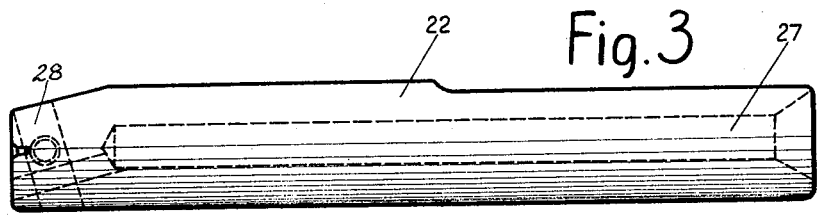
Fig. 3 illustrates a tool holder for the chisel which cuts the threads.

With reference now to the drawings, the rock drill bit 11 is seen to be provided with a rearwardly opening sleeve portion 12 which is provided with internal, rounded threads of the continuous type. At the front part of the bit are arranged cutting inserts 13 of hard metal of the conventional type. One or more radial flushing channels 14 extending to the exterior surface of the bit behind the cutting inserts 13 communicate with a centrally located flushing channel 15 which in turn is in communication with a longitudinally extending flushing channel provided in the drill rod, such as the flushing channel 20 shown in Fig. 6. As is conventional, a flushing liquid is forced through the channels in the drill bit to carry away the rock chips and keep the bit cool. The inner cylindrical portion 16 of the sleeve adjacent the flushing channel 15 has a larger diameter than the flushing channel 15 but this is not critical and can be departed from depending upon the particular design of the drill bit.

Figure 4:
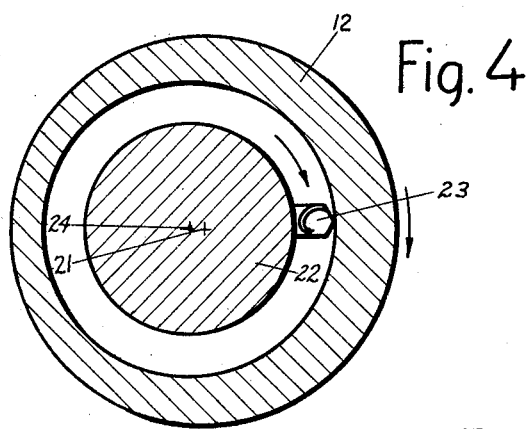
Fig. 4 is a view in transverse section on line 4—4 of Fig. 2 at an enlarged scale showing the cutting action of the rotating chisel.

The improved method for cutting the continuous rounded thread 17 within the cylindrical sleeve portion 12 of the drill bit is illustrated in Figs. 2 and 4. The drill bit 11 and sleeve 12 are clamped in a chuck (not shown) and is revolved about its longitudinal axis 21 at a comparatively slow speed such as for example, 7 to 9 revolutions per minute. A tool holder 22 is mounted in a chuck 25 and the holder 22 is provided with one or more narrow chisels 23 which engage the internal surface 26 of the sleeve 12 and cut the threads 17. The one chisel 23 depicted is rotated by holder 22 about a longitudinal axis 24 which is parallel with but eccentric to the axis 21 of rotation of the drill bit, and the chisel 23 rotates at a much higher speed than the drill bit, such as for example 1000–1200 revolutions per minute but in the same direction as the sleeve 12 as indicated by the arrows in Fig. 4. Simultaneously with rotation of the tool bit 11 and its sleeve portion 12 and rotation of the chisel 23, the bit is fed axially in relation to the tool bit sleeve 12 corresponding to the pitch of the threads 17 and hence the cutting edge of the chisel 23 will machine the rounded threads 17 into the interior surface 26 of the sleeve 12. In effecting the relative axial feed of the chisel 23 with respect to the sleeve 12, the sleeve may be advanced axially toward the chisel 23 while the chisel 23 remains axially stationary during rotation, or the sleeve 12 may remain axially stationary during rotation while the holder 22 and chisel 23 are advanced axially into the cylindrical portion 12. It is also possible to effect a simultaneous axial feed of both the sleeve 12 and the chisel 23. The threads can be cut very quickly without the need for complicated and hence expensive tools and since the chisel 23 is of conventional type and mounted in the holder 22 it is easily exchangeable. The chisel 23 can, if desired be provided with a cutting insert of hard metal and in order to obtain faster machining and a smoother surface, a plurality of chisels may be mounted on the holder 22. The depth of threads 17 can be varied by varying the eccentricity between the two axes of revolution, 21 and 24 for the sleeve and chisel respectively ($\simeq$ half the depth of the thread) and the screw pitch may be changed by making a corresponding change in the axial feed. The direction of rotation of the bit sleeve 12 determines the direction of the thread. Upon rotation in accordance with Fig. 1 and feed against the plane of the paper for the chisel holder 22, one obtains a right-hand thread. It is also possible to make the screw pitch of the thread non-uniform and hence effect a varying pitch thread form by making the feed correspondingly non-uniform.

Figure 5:
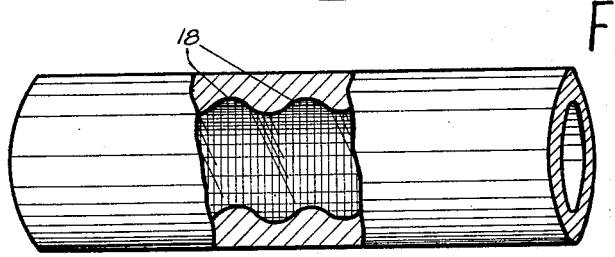
Fig. 5 is a view partly in section showing a drill bit blank after the rounded threads have been cut but prior to forging the front cutting end of the bit.

As previously indicated, one of the principal advantages inherent in the improved method of forming the rounded thread 17 is that the pitch of the grooves 18 cut by the chisel 23 in the surface 26 of the sleeve 12 (see Fig. 5) is only a very small fractional part of the pitch of the threads 17. In fact the pitch of the grooves 18 is preferably made very close to zero in order to obtain a very smooth surface for the threads and a suitable relation between the two pitches can be in the range of from 120:1 to 150:1. However, such range can be departed from without, however, departing from the spirit and scope of the invention provided the groove pitch is considerably less than the thread pitch. The smaller the pitch of the groove cut by the chisel 23 the more the successive turns cut by the chisel will overlap each other thus enabling one to obtain a very smooth and uniform surface.

The chisel 23 cuts, in accordance with Fig. 4, a circular groove in the form of a helix having a very small pitch (= the relation between the number of revolutions of the tool bit sleeve 12 and the number of revolutions of the chisel $x$ screw pitch). At one revolution for the chisel, the bit sleeve 12 has been somewhat turned while for the next revolution of the chisel, the greatest thread depth will be positioned somewhat angularly in relation to the corresponding deepest part of the first revolution, etc. In such manner one obtains a round thread upon the inner surface 26 of the sleeve and the length of the threaded section can be made longer than has been heretofore possible with other methods for forming the thread because of the small dimensions and negligible weight of the chisel which keep the stresses lower and thus also keep the deviations in dimensions to a correspondingly lower degree.

The threads 17 are formed up to the cylindrical space 16 at the front of the sleeve section 12 and while they are being cut provision can be made for cooling the chisel 23 such as by passing air or oil or some other appropriate cooling fluid through a longitudinal channel 27 in the chuck 25 and chisel mounting member 22. The fluid reaches the chisel 23 to cool the same and then carries away the chips, etc. that have been cut by the chisel. Fig. 3 shows a tool holder 22 with the longitudinally extending channel 27 for bringing air to the cutting area and a recess 28 for securing the chisel 23 to the holder. It is also possible by using different mounting arrangements for the chisels to form double or other multiple threads in the sleeve portion 12 as well as the single thread depicted in the drawings, and to also form the threads in a sleeve which has a frusto-conical configuration instead of the uniformly diametered sleeve shown in the drawings, utilizing the same principle.

It has been found that there should be at least three complete threads 17 formed on the inner surface of the bit sleeve in order to obtain a good fastening with the threaded end of the drill rod, and a minimum of five threads are desirable as additional security against unintentional loosening of the two thread parts. It has also been found desirable to have the core diameter of the threads 17 greater than 1.5 times the thread pitch and the thread depth less than 0.5, and preferably less than 0.33 times the thread pitch.

The threaded sleeve 12 of the drill bit is intended to be used preferably with drill rods having a larger flushing channel, for example of a pilger milled type, and in comparison with the flushing channel of the drill rod turned against the flushing channel of the drill bit, the screw pitch for the rounded thread 17 may be smaller than the diameter of the flushing channel 15, as shown in Fig. 1. Such a dimensional relationship makes unintentional unthreading of the sleeve 12 and drill rod 19 even more unlikely because of the fact that the vibratory motion set up by the drill oscillations will be further damped at the threads. This also means the possibility of arranging more threads than hitherto used on the sleeves of drill bits.

Figure 6:
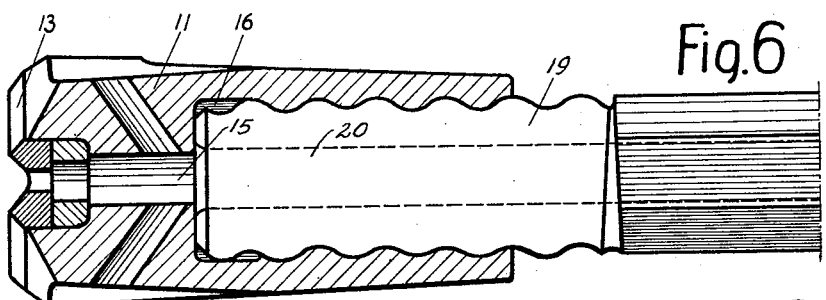
Fig. 6 is a view partly in longitudinal diametral section showing another embodiment of the threaded assembly of the completed bit and the end of the drill rod.

In Fig. 6 of the drawings, the threaded sleeve 12 of the drill bit is screwed upon the threaded pin 19 formed on the end of the drill rod. The cylindrical inner portion 16 of the sleeve has a greater diameter than the core diameter of the threaded part. In this embodiment, which is different from Fig. 1, the fluishing channel 15 in the drill bit may be made somewhat throttled in relation to the flushing channel 20 in the drill rod in order to obtain increased stream speed for the flushing medium.

In conclusion, it will be seen that I have provided an advantageous method for forming the rounded threads in the sleeve of a drill bit. While a specific embodiment for cutting the threads in accordance with the method has been disclosed it is to be understood that minor departures may be resorted to without, however, departing from the spirit and scope of the invention as defined in the appended claims.

I claim:

In the method of forming a continuous rounded thread upon the inner surface of a rearwardly directed open sleeve portion of a rock drill bit, the steps comprising mounting and rotating said sleeve portion on its longitudinal axis, mounting and rotating a chisel in a circular path about an axis eccentric to the longitudinal axis of the sleeve portion at a higher speed of rotation than said sleeve portion, maintaining the rotational axes of said sleeve portion and chisel parallel with and at a constant distance from each other, presenting said chisel in continuous cutting relationship to the interior surface of said sleeve portion throughout the entire circular path of said chisel and effecting an axial feed of said chisel relative to said sleeve portion such that the pitch of the grooves cut by said chisel is but a small fractional part of the pitch of the rounded thread developed upon the interior surface of said sleeve portion as a result of the cutting action.

References Cited in the file of this patent

UNITED STATES PATENTS

| | | |
|---|---|---|
| 969,388 | Miles | Sept. 6, 1910 |
| 2,189,867 | Hagerman | Feb. 13, 1940 |
| 2,191,777 | Stone | Feb. 27, 1940 |
| 2,356,921 | Edwards | Aug. 29, 1944 |
| 2,464,781 | Baker | Mar. 22, 1949 |
| 2,616,103 | Strecher | Nov. 4, 1952 |
| 2,768,393 | Sayce | Oct. 30, 1956 |
| 2,875,661 | Fougeroy-Du Coudrey | Mar. 3, 1959 |